UNITED STATES PATENT OFFICE.

LEONHARD LEDERER, OF MUNICH, GERMANY.

PROCESS OF PREPARING HALOID DERIVATIVES OF ACETONE.

SPECIFICATION forming part of Letters Patent No. 643,144, dated February 13, 1900.

Application filed August 10, 1897. Serial No. 647,759. (No specimens.)

*To all whom it may concern:*

Be it known that I, LEONHARD LEDERER, a citizen of the Kingdom of Bavaria, residing at Munich, Bavaria, Germany, have invented a new and useful Process of Preparing the Halogen Derivatives of Acetone, of which the following is a specification.

It is well known that the halogens act readily upon acetonedicarbonic acid. For instance, bromin added to an aqueous solution of acetonedicarbonic acid is immediately taken up. An aqueous solution of acetonedicarbonic acid decomposed with an alcoholic iodin solution takes up quickly the color of the latter without visible reaction. If, however, this mixture be gently warmed, reaction takes place, evolving carbonic acid gas; but the action of the iodid of hydrogen present in the said iodin solution makes it difficult to obtain the products of such reaction. To obviate this difficulty, I add to the mass a substance which has an affinity for the iodid of hydrogen, thus removing its disturbing influence. Iodic acid serves excellently for this purpose. In this way it is possible to use the iodin to the utmost extent.

In carrying out my process I dissolve ten parts of acetone dicarbonic acid in ten times its mass of water and gradually add thereto twenty parts of iodin while the mixture is constantly stirred. The reaction takes place promptly with a lively evolution of carbonic acid gas. It is advisable to cool gently thereafter, because at a high temperature the periodacetone is easily decomposed by precipitation of iodin. The addition of iodic acid must begin when the light-yellow mass takes on an orange color in reaction. As soon as the iodin is all used up the reaction is ended. The resulting periodacetone is then at once separated from this liquid. Thoroughly washed and dried at ordinary temperature, it forms a light-yellow crystalline powder, which becomes dark on heating up to 60° centigrade. If it has previously been freed from water, it melts at 78° centigrade. On boiling with water it sets free iodin and becomes penta- and eventually tetra iodacetone. Also if not kept dry it sometimes undergoes decomposition at an ordinary temperature, thereby evolving so much heat that vapor of iodin is set free. Alcohol, ether, and most of the organic solvents set free iodin from per-iod-acetone. With dilute soda-lye it forms iodoform in the cold.

The action of iodin on acetone-dicarbonic acid can be so regulated by definite diminutions of the quantity of iodin added as to result in lower stages of iodin combination with acetone. With regard to its behavior toward alcohol and ether the penta-iod derivative is in close relation with the periodacetone. On the addition of dilute soda-lye it is transformed into iodoform even in the cold, but not with the soda solution. If one warms it with the latter, it is converted, as in the case of tetra-iod-acetone, into di-iod-acetone. Bromin and chlorin act in a similar way with regard to acetone dicarbonic acid. In consequence of the liability of setting free halogen hydrogen acids it is not necessary to take any special precautions in observing the progress of the reaction. In some cases it is advisable to add carbonate of calcium or similar substances to combine with the free acids or to use simply dilute solutions of the acetone dicarbonic acid.

The following is the equation for the use of ten molecules of bromin in this process:

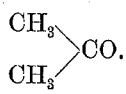

Having thus fully described my invention, what I claim as new, and desire to secure by Letters Patent, is—

A process of preparing a halogen derivative of acetone by causing a halogen to react with acetone dicarbonic acid in the presence of a substance adapted to act on the corresponding halogen hydrogen acid, substantially as set forth.

LEONHARD LEDERER.

Witnesses:
CARL SINGER,
PAUL MUNZ.